United States Patent [19]

Bella et al.

[11] Patent Number: 4,788,935

[45] Date of Patent: Dec. 6, 1988

[54] REFORMABLE CARTON AND CAT LITTER HOUSING ASSEMBLY

[76] Inventors: Roger J. Bella, 1502 Kenneth Cir., Elgin, Ill. 60120; William B. Rochedieu, 3707 Oak Knoll Rd. S., Crystal Lake, Ill. 60012

[21] Appl. No.: 65,027

[22] Filed: Jun. 22, 1987

[51] Int. Cl.⁴ ............................................. A01K 67/00
[52] U.S. Cl. ............................................................ 119/1
[58] Field of Search ............... 119/1, 15, 19; 220/401, 220/408, 449; 383/119

[56] References Cited

U.S. PATENT DOCUMENTS

| | | | |
|---|---|---|---|
| 3,581,977 | 6/1971 | Kirsky et al. | 119/1 |
| 3,684,155 | 8/1972 | Smith | 119/1 |
| 4,312,295 | 1/1982 | Harrington | 119/1 |
| 4,352,340 | 10/1982 | Strubelt | 119/1 |

Primary Examiner—Gene Mancene
Assistant Examiner—R. Thomas Price
Attorney, Agent, or Firm—John J. Kowalik

[57] ABSTRACT

A disposable cat litter container made of a precut and scored sheet of paper board which is foldable initially into a compact shipping carton containing litter and a plastic bag, the carton being partially unfoldable into a support structure having a bottom, side and end walls. The support structure is insertable into the bag. The bag covers the top of the structure and forms a roof therefore and the open end of the bag aligns with an opening in the support structure accommodating ingress and exit of the animal with respect to the container.

20 Claims, 3 Drawing Sheets

REFORMABLE CARTON AND CAT LITTER HOUSING ASSEMBLY

BACKGROUND OF THE INVENTION

Various forms of cat litter boxes are available on the market today. The typical structure is an open top tray having a bottom and upright walls which may be inclined to prevent the cat from scattering the litter as it scratches through it.

Other devices feature a box which is laid upon a flat plastic sheet so that any scattered litter will fall upon the sheet and when the tray is to be discarded, the sheet is adapted to be wrapped about the tray and disposed of with it.

Another disclosure illustrates a pair of telescoping boxes which are extended for use and then telescoped and discarded when the litter is spent.

SUMMARY OF THE INVENTION

In all of the foregoing disclosures, the device is either too bulky as in the telescoping box arrangement or is too expensive since the upper portion of such a box arrangement is not indispensible and serves only a minimal purpose. Various structures heretofor mentioned are shown in U.S. Pat. Nos. 4,348,982; 4,646,685; 4,501,226 and 4,628,863.

The instant invention comprehends a structure in which a piece of paperboard is cut and scored to form upon folding a bottom, side and end walls and overlapping cover portions of a shipping carton to enclose litter and a plastic bag, and in which the cover portions are unfoldable to form a tray and side and end wall extensions, the tray and extensions being insertable into the bag which forms a roof and embraces the extensions and forms a container for the cat which may enter and depart the container through an aperture in one of the end wall extensions and the open end of the bag aligned therewith.

A principal object of the invention is to provide a novel, relatively inexpensive cat litter box compactly packaged and having a minimum of parts which can be assembled by the ordinary person with practically no mechanical knowledge.

A further object is to provide a cat litter box in which a plastic bag is used as part of the structure in erecting the box and wherein the bag serves as a sanitary disposal simply by collapsing the box within the bag to reduce its bulk whereupon the bag may be closed and tied and discarded.

The invention is directed to a disposable litter container which is initially folded into a small shipping carton enclosing the litter and a plastic bag, the carton having parts which are unfolded to provide a skeletal housing structure for insertion into the bag which provides parts complementing the structure and which is tightly drawn about the structure and forms a house therewith into which the cat enters through the open end of the bag and a doorway in the structure.

The general object of the invention is to provide a novel cat litter box or package in which a disposal bag is used as the total enclosing moisture proof container for discarding the spent litter, but also initially serves as a structural part of the container.

The invention contemplates using a paperboard structure to form a tray and upright supports and inserting the structure into a plastic bag which is drawn tightly about the structure by a draw string mounted about the open end of the bag, which open end provides a way for the cat to enter and exit from the container formed by the assembly of the bag with the paperboard structure.

The invention further comprehends utilizing the elasticity of the bag, which may be made of any resin such as polyethylene or polypropyle etc., to provide tensile and hoop forces about the paper structure to hold the parts in place and to prevent its collapsing.

The broad aspects of the invention are in providing a construction in which a minimal quantity of parts are used and which may be assembled in one way to provide a convenient shipping carton and in another way to provide a litter container and in which the parts are refolded into a shape which is easily contained in the bag which may be closed and discarded with the contaminated parts.

These and other objects and advantages inherent in the invention will become more readily apparent from the specification and the drawings, wherein:

FIG. 1 shows the assembly in disposal condition.

DESCRIPTION OF THE INVENTION

Figure 1:
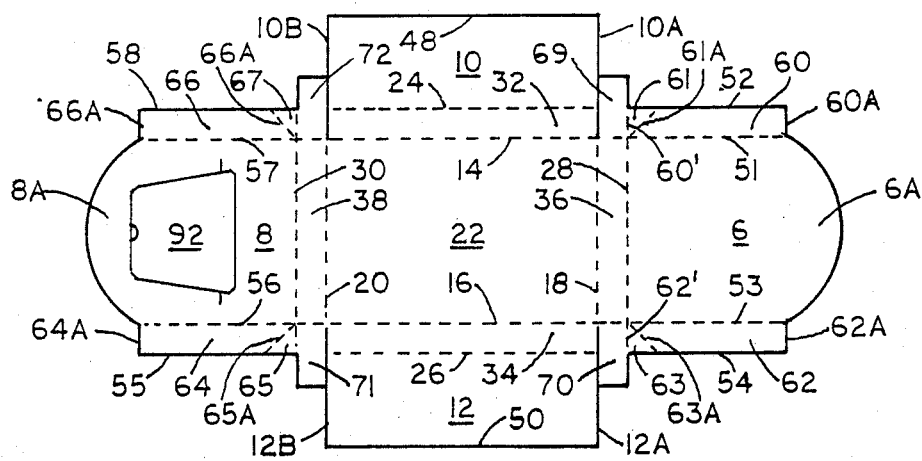
FIG. 1 is a top plan view of a sheet of paperboard cut and scored to form, upon folding, the novel litter box.
Figure 2:
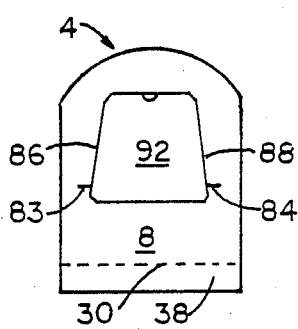
FIG. 2 is an end view of the box taken substantially on line 2—2 of FIG. 3.

Having particular reference to the drawings, there is shown a cat litter container 2 having a skeletal frame structure 4 which is made from a flat sheet of paperboard, commonly known as cardboard, as best seen in FIG. 1.

The paperboard is die cut to form a pair of end panels 6 and 8 and side walls 10 and 12 and is scored or creased at 14,16 and 18,20 along the inner edges of the panels and side walls respectively to form a rectangular center panel or bottom or base 22.

The side walls have second crease lines 24,26 parallel with the lines 14,16 and spaced inwardly therefrom and the end panels have second score lines 28,30 parallel with crease or score lines 18,20 spaced outwardly therefrom and forms wall sections 32,34,36, and 38 of equal short height which are adapted to be bent upwardly and thus form a tray with the bottom wall 22 into which the original fresh kitty litter is poured. The lower wall sections form the sides of a shallow shipping carton or box 40 as seen in FIGS. 5–7 and 10 and 11. The carton contains a plastic bag 42.

Figure 12:
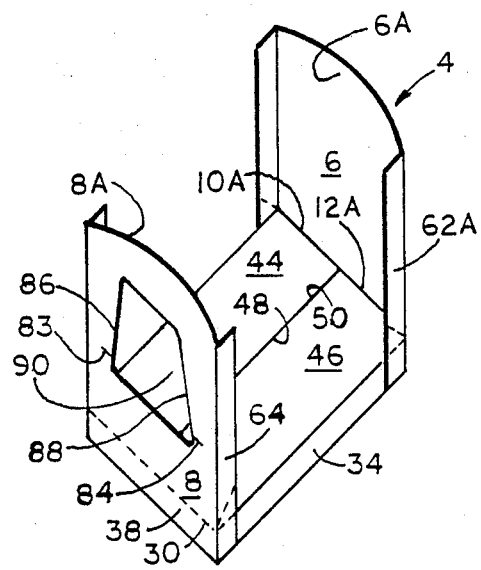
FIG. 12 is a perspective view of the unit with the end walls raised.

The scores 24,26 allow the upper sections 44,46 of the side walls 10 and 12 to be folded over the base 22 to close the box 40 as seen in FIG. 12. The dimensions of the sections 44, 46 are such that their free edges 48,50 tightly abutt against each other as shown in FIG. 12 to provide a tight enclosure for the kitty litter so that it will not sift out during transport.

Figure 9:
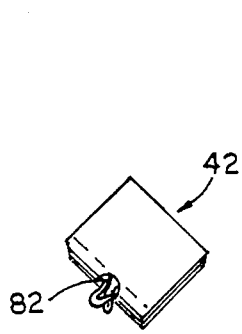
FIG. 9 is a side view of the bag in folded storage position.

The bag 42 shown in its folded position in FIG. 9 is laid out on top of the flaps 44,46 and the end flaps which constitute the upper portions of panels 6,8 are folded over the bag 42.

Figure 3:
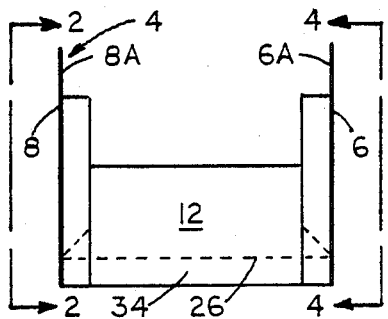
FIG. 3 is a side elevational view showing the side walls in raised position.
Figure 4:
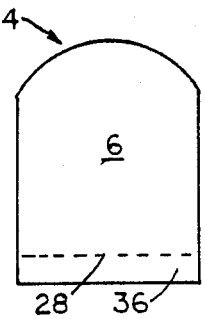
FIG. 4 is an end view taken substantially on line 4—4 of FIG. 3.
Figure 5:
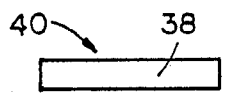
FIG. 5 is an end view showing the box folded into a shipping carton.
Figure 6:
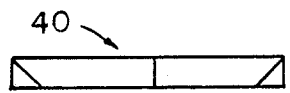
FIG. 6 is a side view of FIG. 5.
Figure 7:
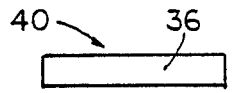
FIG. 7 is an end view taken from the opposite end of FIG. 5.
Figure 8:
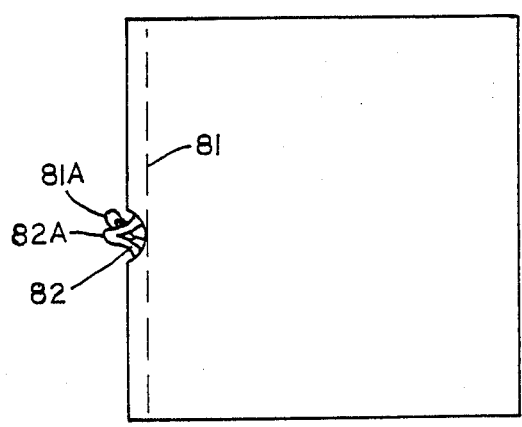
FIG. 8 is a side view of the plastic bag used in the construction.
Figure 10:
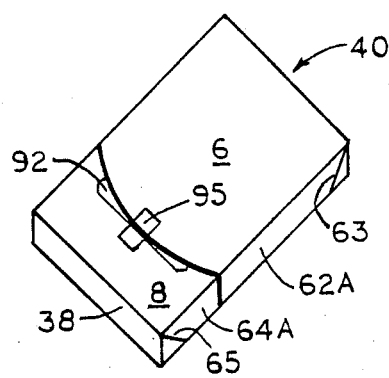
FIG. 10 is a perspective top view of the device shown as a shipping carton.
Figure 11:
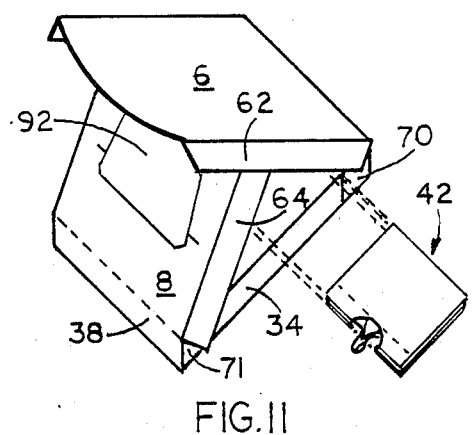
FIG. 11 is a top perspective view of the shipping carton of FIG. 10 shown in partially unfolded position and the bag shown alongside.
Figure 13:
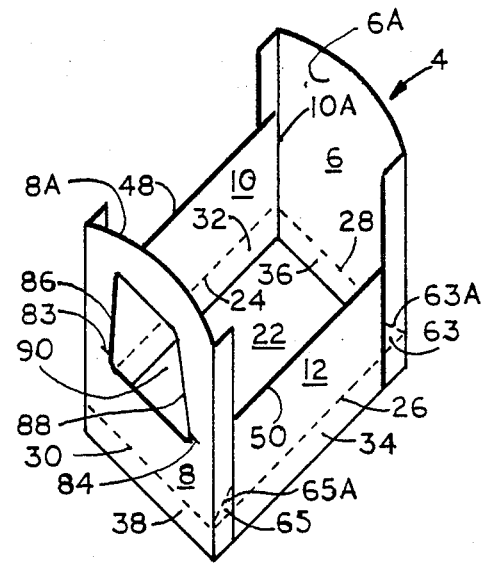
FIG. 13 is a perspective view of the unit showing the end and side walls raised.
Figure 14:
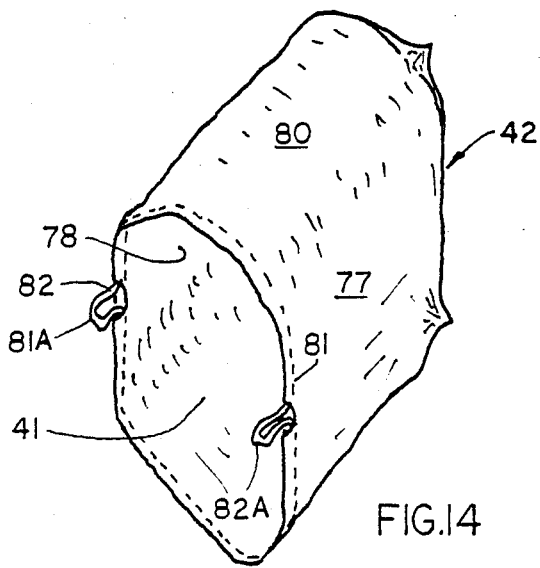
FIG. 14 is a perspective view of an expanded view of the bag.
Figure 15:
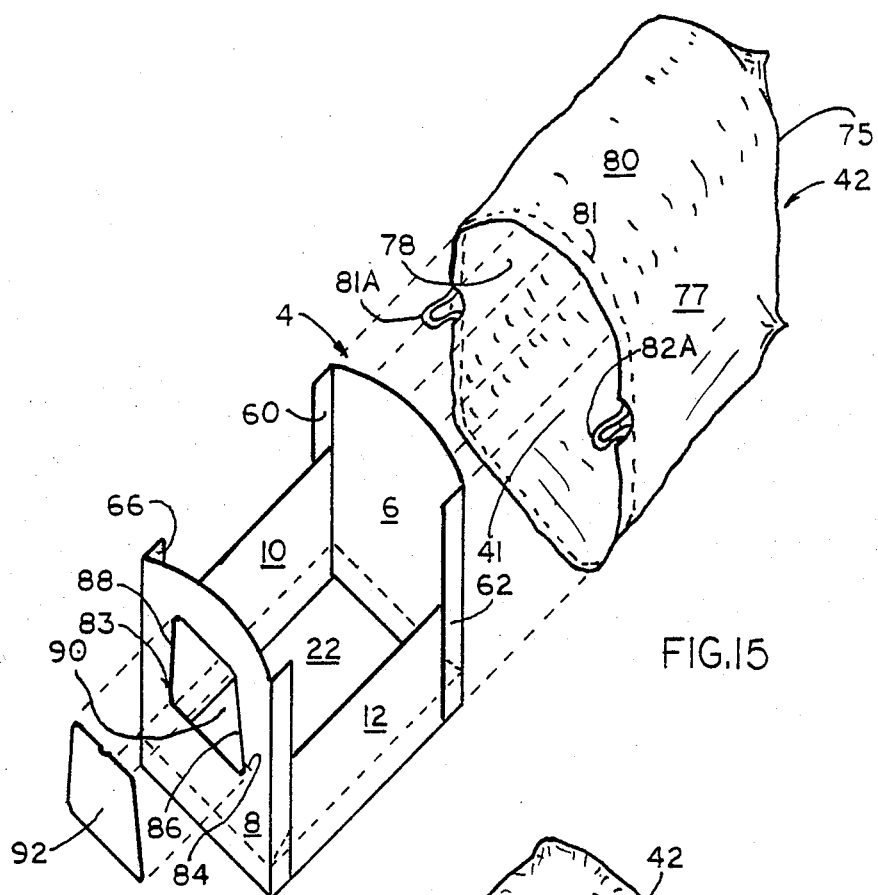
FIG. 15 is an exploded perspective view of the bag and container-forming insert.
Figure 16:
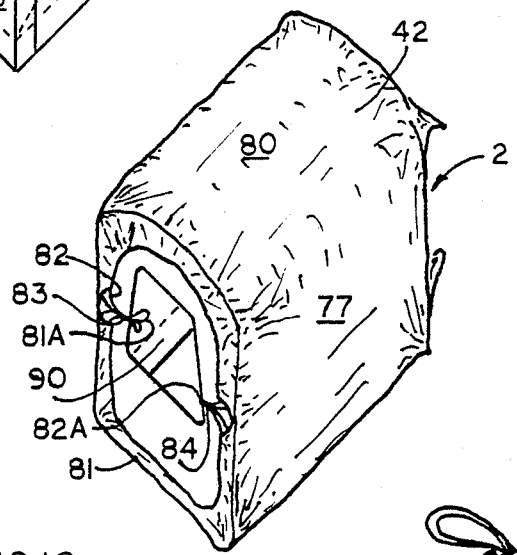
FIG. 16 is a perspective view showing the parts in assembled position.

It will be seen that the panels 6 and 8 are provided with scores at 51, 53 and 55,57 respectively inwardly of their lateral edges 52,54, and 56,58 to provide stiffening flanges 60,62 and 64,66 which in the upright position of the panels extend normal thereto as best seen in FIG. 12 as well as in FIGS. 13, 15 and 10 in which the portions 60,62 and 64,66 laterally overlap the side portions 32,34. The flanges 60,62 have upper sections 60a62a and lower section 60′,62′ which are are connected by by hinge folds or dart folds 61,63 and the flanges 64,66 have upper sections 64a,66a connected by hinge or tuck darts or folds 65,67 which are formed by appropriate diagonal scores 61a,63a,65a,66a and permit the tabs 69,70,71 and 72 to lay against the lower wall sections 32,34 and permit folding of the upper end panel sections over the upper side panel sections. It is desirable for the upper and lower panel sections to be connected so that in the upright position of the end panels the flanges 60–64 maintain their greatest rigidity and engage the inner sides 6a and 8a of the end panels 6,8 with the edges 10a,10b and 12a, 12b of the side panels 10 and 12, respectively, with an interference fit. In the partly unfolded position of the base unit or structure 4 as seen the FIGS. 3, 13 , and 15 it is ready for insertion into the open end 41 of the bag 42. The unit is moved endwise into the open bag until the end panel seats against the closed bottom end wall 75 of the bag and the the peripheral wall covers the sides and top and bottom of the skeletal structure 4. The bottom seats against the end panel 6 and the bag provides side wall portions 77,78 and a roof 80.

The open end portion of the bag is folded over the front panel 8 and is cinched about the front panel 8 drawing the closed bottom of the bag taut against the back panel 6 by a draw string 82 which extends through a hemming 81 provided about the opening 41 in the bag. The ends 81a,82a are tightly secured in slits 83,84 provided in the vertical edge portions 86,88 flanking a doorway opening 90 in the end panel 8 through which the cat may gain entry into the container and exit therefrom.

A door or cover 92 is provided shaped like the doorway for closing it to reduce odors. The door is removable.

Figure 17:
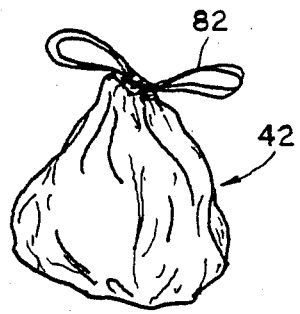

After the litter is spent, the ends 81a,82a are pulled out of the slits 83,84 and the bag is slightly loosened about the framework 4. The side panels are collapled inwardly by pressing through the sides of the bag and then the ends of the bag are pressed inwardly against the end panels 6 and 8 folding them inwardly over the side panels 10,12 and the tie string is pulled at its ends drawing the open end of the bag closed. The string is then knotted to form a sealed sanitary bag as seen in FIG. 17 and then is disposed of.

Thus it will be apparent that a novel easily assembled and collapsible sanitary unit is provided which minimizes handling and provides an excellent secluded confinement for the cat.

A securement tape is shown at 95 to maintain the carton closed.

We claim:

1. A single use entirely disposable cat litter unit comprising a frame structure including a litter-filled bottom tray portion and side walls and end panels extending upwardly therefrom and,
   one of said end panels having an opening therein,
   said walls and panels engaging each other along lateral margins thereof,
   a flexible bag enclosing the frame structure and having an open end providing a cat-entry and exit doorway through said opening for said unit.

2. The invention according to claim 1 and said bag having drawstring means about its open end for cinching the bag tightly about said structure for holding said walls and panels in engagement.

3. The invention according to claim 2 and and
   said draw string means having ends, and
   means for fastening the ends of said drawstring means to one of said end panel.

4. The invention according to claim 1 and said side walls being foldable over the tray and said end panels being hinged and foldable over the side walls and said bag being closable to retain said side walls and end panels in folded position for discard of said unit when the litter is spent.

5. The invention according to claim 1 and said structure being made of foldable material and said side walls being foldable over the tray and said end panels being foldable over the side walls to provide a shallow shipping carton.

6. The invention according to claim 1 and said bag being made of plastic resilient material adapted to be tightly stretched over said frame structure and imposing a stress thereon for holding the same thereof from collapsing.

7. The invention according to claim 1 and means about the open end of the bag for imposing a force thereon and thereby tensioning the bag about said structure.

8. The invention according to claim 1 and said bag being made of resilient material and,
   draw string means attached about the open end of the bag for tightening the bag about said frame structure.

9. The invention according to claim 1 and said end panels being of greater height than said side walls and defining an open top therewith, and
   said bag closing off the top and providing a roof therefor.

10. A cat litter enclosure comprising an internal relatively rigid structure foldable from a scored flat blank sheet into a quadrilateral tray having a bottom and upright wall portions,
    and end panels connected with a pair of opposing wall portions and side wall tray cover forming portions connected with the other opposed wall portions, said cover portions being adapted to be folded toward each other to cover the tray and said end panels being adapted to be folded over the cover portions and forming a shipping carton with the tray, and means for encasing said structure for holding the tray and said end panels and wall portions an upright position.

11. The invention according to claim 10 and said cover portions and end panels adapted to be erected in upright position to form a support, and said means comprising a flexible plastic sack enclosing said tray and extending over the support and forming a roof for the enclosure.

12. The invention according to claim 11 and one of said end panels having an opening therein forming a doorway for entry and exit with reference to the enclosure, and said sack having an open end in alignment with said doorway, and means for releasably securing said sack at said open end to said structure, said structure being foldable within said sack and the sack being collaplible about said structure therewithin and being discardable therewith as a sanitary throwaway.

13. The invention according to claim 10 and an open ended bag encasing said structure and in the extended upright position of said tray-cover portions and said end panels forming a house-like container with said structure, one of said end panels having a doorway therein coincident with the open end of the bag to provide entry and exit.

14. The invention according to claim 13 and said end panels positionable to extend upwardly above the side wall tray cover portions and having arch-shaped upper edges forming a height-increasing arched roof portion with the bag, and said roof portion providing a slidable cat-tail engaging inner surface to prevent accidental collapse of the enclosure.

15. A kitty litter holder comprising a flat sheet of precut scored material foldable into a shipping carton for containing litter and a plastic bag, said carton having side and end portions unfoldable to provide a litter-holding tray and upright side and end extensions extending above the tray and forming a bag-support structure, a bag positioned in encasing relation to said tray and structure and being tightly drawn thereabout for holding said tray and structure in an upright position and to provide a roof therefor, and said bag having an open end providing a passageway into and out of said holder.

16. The invention according to claim 15 and said side extensions having flanges positionable alongside said side portions and holding said extensions relatively rigid.

17. The invention according to claim 15 and said flanges having lower and upper portions, and hinge means interconnecting said upper and lower portions and accommodating limited folding and unfolding of said end portions.

18. The invention according to claim 15 and said bag having adjustable means about said open end adapted to draw the bag tightly against the structure to stabilize said structure.

19. The invention according to claim 15 and said bag being made of a resinous material and stretchable about said support structure and imposing a tensile loads on the tray and end portions for holding the same in mutually supporting relation.

20. The invention according to claim 19 and means for drawing the bag about the open end thereof.

* * * * *

UNITED STATES PATENT AND TRADEMARK OFFICE
CERTIFICATE OF CORRECTION

PATENT NO. : 4,788,935

DATED : December 6, 1988

INVENTOR(S) : Roger J. Balla and William B. Richedieu

It is certified that error appears in the above-identified patent and that said Letters Patent is hereby corrected as shown below:

On the Title Page, Item [19], "Bella et al." should be --Balla et al.--

Item [76], "Roger J. Bella" should be --Roger J. Balla--.

Signed and Sealed this

Second Day of May, 1989

*Attest:*

DONALD J. QUIGG

*Attesting Officer*

*Commissioner of Patents and Trademarks*